United States Patent [19]

Kawasumi et al.

[11] 4,309,457
[45] Jan. 5, 1982

[54] PROCESS OF PRODUCING MULTILAYER-COATED COMPOSITE POWDER

[75] Inventors: Yoshio Kawasumi, Urawa; Mitsuo Takahashi, Tokyo, both of Japan

[73] Assignee: Nihon Kogyo Kabushiki Kaisha, Tokyo, Japan

[21] Appl. No.: 84,024

[22] Filed: Oct. 11, 1979

[30] Foreign Application Priority Data

Oct. 16, 1978 [JP] Japan ................................ 53/126171

[51] Int. Cl.³ ............................................. B05D 5/00
[52] U.S. Cl. .................................... 427/214; 427/217; 427/216; 428/570; 428/403; 75/231
[58] Field of Search ...................... 252/12, 26; 75/231; 428/570, 403; 427/214, 216, 217

[56] References Cited

U.S. PATENT DOCUMENTS 3,956,528  5/1976  Ugro .................................... 427/426

Primary Examiner—Sam Silverberg
Attorney, Agent, or Firm—Seidel, Gonda, Goldhammer & Panitch

[57] ABSTRACT

A multilayer-coated composite powder is produced by a first step of treating a core powder to be coated with first metallic ions and a metallic powder for reducing the first ions and thereby forming a single-layer coated powder, and a second step of treating the single-layer-coated powder with either only second metallic ions other than the first metallic ions or the second ions in the presence of a metallic powder for reducing the second ions. Where necessary, the second step is repeated the number of times required for forming a predetermined number of coating layers.

9 Claims, No Drawings

PROCESS OF PRODUCING MULTILAYER-COATED COMPOSITE POWDER

BACKGROUND OF THE INVENTION

This invention relates to a process of producing a multilayer-coated composite powder each particle of which has two or more coating layers. More particularly, the invention is concerned with a process of producing a multilayer-coated composite powder for use in manufacturing sintered bodies, such as electric contacts, which are required to have highly uniform quality.

In electric machines and instruments, the contacts play such important roles that they practically dictate the performance of the equipment. Consequently, the contact materials are placed under strict quality control. Electric contacts are roughly classified into three types, switching, sliding, and stationary types, but are available in wide varieties for diversified applications handling from strong to weak currents. The properties a given contact material should possess depend on the intended use of the product, but generally important considerations governing the choice of material are that it must involve no material transfer or attrition, cause no fusion of contacting surfaces, provide low contact resistance, ensure a stable contacting condition, exhibit good discharge characteristics, be highly resistant to oxidation and sulfurization, be subject to little mechanical wear or deformation, and have excellent workability. In order to best meet the property requirements for the intended applications, materials of multi-component systems in which varied addition elements are compounded have been put in use, in a great number of combinations. Not merely metallic elements but also metallic sulfides, metallic oxides, metallic carbides, carbonaceous substances, glass, ceramics, etc. in numerous combinations are in use.

For the manufacture of electric contacts from these materials, powder sintering is being widely adopted aside from the traditional melting method. Powder sintering is suited for the materials usually difficult to work, and for the materials comprising two or more constituents which do not form a solid solution with each other, enabling the individual constituents to offset the shortcomings of each other to improve the general properties of the mixture. The method of manufacture by powder sintering commonly comprises the steps of die pressing a premix of the necessary constituents in powder form or an originally alloyed powder to form a green compact of a given shape, and then sintering and finishing the compact.

Where a mixture of various kinds of powders is employed, it is difficult to uniformalize the quality of the products, and where an alloy powder is used, the objectives of applications are very limited. As a result of extensive investigations made with the foregoing in view, a conclusion has now been reached that it is most advisable to use composite powder in the fabrication of electric contacts and the like. Compacting and sintering of the composite powder will naturally ensure the uniformity of the products. However, here arises a basic question as to the way of preparing a multi-layered composite powder to a high quality at low cost and in a simplified process. As noted above, the materials for electric contacts and the like are required to have a variety of desirable properties which are well balanced for a particular purpose. To achieve this end, it is essential that a plurality of constituents are in a precise blended ratio and are uniformly distributed throughout. However, where a composite powder, especially of three or more components, is to be used, the compounding ratio determined by the depth ratio of coating layers is guite difficult to control. Composite powder consists of core particles and a single- or multiple-layer coating formed on the individual particles. So long as the coating layer(s) are deposited by the conventional electroless chemical reduction plating technique, the amount of deposition is hardly controllable. In addition, the ordinary processes for producing composite powder require expensive chemicals such as a reducing agent and involve complicated production steps. The more the number of coating layers to be formed, the greater the difficulty in controlling the amount of deposition will be. Accordingly the production cost will rise and the process steps will become more complex. Thus, the problem of fabricating a multi-component-containing high-quality electric contact or the like from a composite powder is boiled down to a simpler problem of finding a way of producing a high quality multilayer-coated composite powder at low cost and in a simplified process.

SUMMARY OF THE INVENTION

With these in view, diversified trials were made on the manufacture of multilayer-coated composite powders. As a result, it has now been found that such a powder that satisfies the deposition requirements can be made economically and easily by repeating a coating treatment which depends on a cementation reaction the number of times required.

Thus, in accordance with the present invention, a process for producing a multilayer-coated composite powder is provided, which comprises a first step of coating treating a starting core powder with first metallic ions and a metallic powder for reducisng the first ions and thereby forming a single-layer-coated powder, a second step of coating treating the single-layer-coated powder either with only second metallic ions other than said first metallic ions or with said second ions in the presence of a metallic powder for reducing said second ions, and, where necessary, an additional step or steps for repeating said second step according to the number of coating layers required.

DETAILED DESCRIPTION

The present invention will now be described in more detail.

For the process of the invention, the powders to provide the bases or cores of multilayer-coated composite powders, that is, those which can called as core or starting powders, include most of the powders insoluble in water. In particular, for the fabrication of electric contacts, the following powders may be used.

Carbonaceous powders: of coke, carbon black, graphite, and charocal.

Metallic sulfide powders: of $MoS_2$, $WS_2$, and CuS.

Metallic carbide powders: of SiC, WC, and TiC.

Metallic oxide powders: of CdO, $SnO_2$, $TiO_2$, ZnO, $SiO_2$, $Al_2O_3$, NiO, CuO, $Co_3O_4$, $In_2O_3$ and $Zr_2O_3$.

Metallic powders: of Ni, Co, Au, Ag, Pt, Cu, Fe, Zn, Sn, W, Mo, Te, In, Al, Si, Pb, Cd, Pd, Ru, and Bi.

Alloy powders: of various alloys of the above-mentioned metals.

Others: of glass, talc, ceramics, and boron nitride.

With regard to the particle size of the core powder, there is no special, critical limitations but it usually ranges from 20 to 2000μ. If the particles are coarser or finer outside the range, there will be a tendency of the particles being coated with somewhat less metal than the particles within the range. The starting core powder may be subjected to preliminary granulation and sizing in case the core powder is too fine or has an excessively large proportion of flat or angular grains or has an excessively broad range of particle size.

According to the intended use of the end product, a suitable core powder is chosen. The core powder particles are coated, in succession, with desired metals in the number of layers required. The metals capable of forming coating layers, for example, for electric contacts, include cobalt, nickel, copper, silver, gold, palladium, ruthenium, and platinum. A solution of such a metal, in the form of a soluble salt, in a solvent is prepared. The salt may be one of nitrates, hydrochlorides, sulfates, ammonium salts, organic acid salts, cyanates, and mixed systems of those salts, The concentration of particular metallic ions in the solution is governed by the particle size of the core powder and the amount of the metal coating on the particles, ranging from 0.5/1 to the saturation point. As the solvent, water may be employed.

The powder to be used for the metallic ion reduction is the powder of a metal or alloy electrochemically baser than the particular metal desired to coat the core powder. Examples are copper, iron, zinc, aluminum, magnesium, and calcium. The particle size of the metallic-ion-reducing powder may be suitably chosen in proportion to the size of the core powder. The proper amount to be added is believed to be slightly more, say about 1.01 times larger, than the stoichiometric equivalent of the intended amount of the metal to cover the core powder.

For the second and further layers, the use of the metallic-ion-reducing powder is not essential. This is because part of the already applied metal layer acts as a metallic-ion-reducing agent and a new metallic layer is formed to replace the part of the old metal layer.

In the operation, the starting core powder in a reaction vessel is first coated with a first metal to form a first layer. The reaction vessel is charged with the core powder and the first metallic-ion-reducing powder in an amount calculated on the basis of the aimed amount of the first metal to be deposited on the core particle. The vessel must be equipped with means for producing an adequate stirring action. To this end, a vessel having blades which will create a planetary motion is employed. While the two powders are being thoroughly mixed, the first metal salt solution is added. This is desirably done in such a way that the addition up to the realization of the funicular [II] region takes a relatively long period, for example, from 20 seconds to 10 minutes, and then the slurry region is reached in a short period of from 5 to 10 seconds. The terms "funicular region" and "slurry region" as used herein mean two of five different stages of solid-liquid systems classified and indicated according to the degrees of packing density and fluidity. For reference the five stages defined by the indication method are tabulated below:

| Region | Solid phase | Liquid phase | Condition | Fluidity |
|---|---|---|---|---|
| (1) Pendular | Continuous | Discontinuous | Loose | Dilatant dispersion |
| (2) Funicular [I] | Continuous | Continuous | " | Pseudoplastic dispersion |
| (3) Funicular [II] | Continuous | Continuous | " | Plastic dispersion |
| (4) Capillarly | Discontinuous | Continuous | Viscous | Shear hardened dispersion |
| (5) Slurry | Discontinuous | Continuous | Muddy | False body dispersion |

The periods of time required for reaching the funicular and slurry regions vary with the sizes and amounts of the powders, agitation efficiency, and other factors. The first metal solution is desirably added batchwise for increased homogeneity. Following the addition of a desired amount of the first metal solution, stirring of the mixture is kept on, for example, for about 30 seconds. After the stirring, the resulting first-layer-coated powder is recovered.

Next, the coating for the formation of the second layer is done. The first-layer-coated powder is washed with water, and part of the supernatant fluid is removed, for example, by decantation, to leave a slurry behind. To this slurry is added, with stirring, the second metal salt solution desired to form the second layer. If necessary a powdery metal for the reduction of the second metal ions may be added. In this manner the second layer is formed over the first layer or partly in place of the first. The same procedure is repeated the number of times desired to form the third, fourth, or further layers.

The powder thus eventually obtained by coating the individual core particles with a desired number of layers is a multilayer-coated composite powder of high quality whose respective metal layers are controlled in amounts within plus or minus 0.3% of the target values, with the individual layers quite even in thickness.

EXAMPLE 1

Into a glass beaker were placed 12.5 g of a commercially available molybdenum powder (−325 mesh in particle size) and 66 g of a metallic iron powder (−100 mesh). With stirring, 825 cc of an aqueous solution of copper sulfate with a copper concentration of 100 g/l (1.1 times the amount of copper required for the reaction $Fe + Cu^{++} \rightarrow Cu + Fe^{++}$) was gradually added to form a copper-coated Mo powder. This powder was washed with water, part of the supernatant fluid was discarded by decantation to form a slurry, and then 2352 cc of an aqueous solution of silver nitrate with a silver concentration of 100 g/l was slowly added with stirring to the slurry. A double-layer-coated composite powder consisting of Mo in the center, a Cu coating layer, and an outer layer of Ag resulted. After water washing and drying, the product weighed 255.1 g. A chemical analysis showed that the composition of the product was 92.0% Ag, 2.9% Cu, and 4.9% Mo.

EXAMPLE 2

In a glass beaker, 12.5 g of a commercially available molybdenum powder (−325 mesh in size) and 69.3 g of a commercially available electrolytic copper powder (−325 mesh) were mixed with water and stirred until the mixture became slurry, with gradual addition of 2352 cc of an aqueous solution of silver nitrate with a silver concentration of 100 g/l. A silver-coated molybdeum powder was thus formed. After washing with water, the supernatant fluid was removed and a slurry was obtained. To this slurry was added 66 g of a metallic iron powder (−100 mesh) and, with stirring, 825 cc of an aqueous solution of copper sulfate with a copper concentration of 100 g/l was gradually added. In this way a double-layer-coated composite powder consisting of Mo in the center, an Ag coating layer, and an outer layer of Cu was formed. After water washing, antirust treatment, and drying, the product weighed 255.1 g. A chemical analysis indicated that the composition of the powder was 4.9% Mo, 92.0% Ag, and 2.9% Cu. Iron accounted for less than 0.01% of the total weight. As regards the outer appearance, the powder was evenly copper-like in the color.

EXAMPLE 3

Twenty grams of a commercially available graphite powder (−325 mesh, with a fixed carbon content of 98%) and 188.8 g of a metallic iron powder (−100 mesh) were placed into a glass beaker. With stirring, 2200 cc of a copper nitrate solution with a copper concentration of 100 g/l was gradually added so as to form a copper-coated graphite powder. After washing with water, the supernatant fluid was removed to leave a slurry behind. While the slurry was being stirred, 2441 cc of an aqueous solution of silver nitrate with a silver concentration of 100 g/l was gradually added to obtain a double-layer-coated composite powder consisting of graphite in the center, a Cu coating layer, and an outer layer of Ag. After water washing and drying, the product weighed 406.9 g. A chemical analysis indicated that the composition of the product was 4.9% C, 35.0% Cu, 59.8% Ag, and less than 0.01% Fe. The powder looked silver white throughout.

EXAMPLE 4

Twenty grams of a commercially available $MoS_2$ powder (−325 mesh, with a purity of 99%) and 153.5 g of a metallic iron powder (−100 mesh) were placed into a glass beaker and, with stirring, 1760 cc of a copper sulfate solution with a copper concentration of 100 g/l was gradually added so as to form a copper-coated molybdenum disulfide powder. After washing with water, the supernatant fluid was removed to form a slurry. While the slurry was being stirred, 6990 cc of an aqueous solution of chloroaurate with a gold concentration of 40 g/l was gradually added and a double-layer-coated powder consisting of $MoS_2$ in the center, a Cu coating layer, and an outer layer of Au was formed. After water washing, the supernatant fluid was abandoned to prepare a slurry. To this slurry was added 17.7 g of a commercially available electrolytic copper powder (−325 mesh). With stirring, 600 cc of an aqueous solution of silver nitrate with a silver concentration of 100 g/l was further added to obtain a triple-layer-coated composite powder consisting of $MoS_2$ in the center, a Cu coating layer, an outer Au layer, and an outermost layer of Ag. After water washing and drying, the product weighed 399.2 g. A chemical analysis showed that the composition was 5.0% MoS, 9.9% Cu, 69.9% Au, 15.0% Ag, and <0.01% Fe. It looked evenly silver white.

EXAMPLE

The individual multilayer-coated powders obtained in the foregoing examples and the powder mixtures having a composition corresponding to each of the examples each composed of the respective source constituents and mixed on a V mixer for one hour, were separately pressed in dies with a pressure of 4 t/cm² and the resulting compacts were polished on the surface and observed through an optical microscope (20X). The test pieces according to the invention exhibited quite thorough sidpersion of the constituents, whereas the test pieces of mixed-powder compacts showed very poor dispersion with much segregation.

As described hereinabove, the present invention made it possible to produce, economically and in a simplified way, a multilayer-coated composite powder suited for the manufacture of powder sintered parts, such as electric contacts, which are required to be blended to strict specifications and be uniform in the distribution of the addition constituents throughout. The composite powders produced in accordance with the invention have extensive uses aside from electric contacts, for example, as welding rod and battery electrodes, abrasives, bearing materials, magnets, and other applications where high-grade sintered compacts are needed.

What is claimed is:

1. A process for producing a multilayer-coated composite powder, which comprises a first step of coating treating a starting core powder with first metallic ions and a metallic powder for reducing the first ions to thereby forming a single-layer coated powder by cementation reaction, a second step of coating treating the single-layer coated powder either with only second metallic ions other than said first metallic ions or with said second ions in the presence of a metallic powder for reducing said second ions to form a double-layer coated powder by cementation reaction, and, where necessary, an additional step of steps for repeating said second step according to the number of coating layers required.

2. A process desired in claim 1 wherein the starting core powder is one selected from a group of carbonaceous powders of carbon, graphite, and charcoal; metallic sulfide powders of $MoS_2$, $WS_2$, and CuS; metallic carbide powders of SiO, WC, and TiC; metallic oxide powders of CdO, $SnO_2$, $TiO_2$, ZnO, $SiO_2$, $Al_2O_3$, NiO, CuO, $CO_3O_4$, $In_2O_3$ and $Zr_2O_3$; metallic powders of Ni, Co, Au, Ag, Pt, Cu, Fe, Zn, Sn, W, Mo, Te, In, Al, Si, Pb, Cd, Pd, Ru, and Bi; alloy powders of various alloys of the above-mentioned metals; glass; talc; ceramics; and boron nitride.

3. A process described in claim 1 wherein the starting core powder has a particle size between about $20\mu$ and $2000\mu$.

4. A process described in claim 1 wherein the metal forming coating layers is one selected from a group of cobalt, nickel, copper, silver, gold, palladium, ruthenium and platinum.

5. A process described in claim 4 wherein the source of coating forming metallic ion is a solution of a salt of nitrates, hydrochlorides, sulfates, ammonium salts, organic acid salts, cyanates, and mixed systems of those salts.

6. A process described in claim 5 wherein the concentration of particular metallic ions in the solution is ranged from 0.5 g/l to the saturation point.

7. A process described in claim 1 wherein the reducing metallic powder is one selected from a group of copper, iron, zinc, aluminum, magnesium and calcium and alloys thereof.

8. A process according to claim 1 wherein the addition of the solution containing coating metallic ion is so effected that the funicular II region is reached in about 20 seconds to 10 minutes and then the slurry region is reached in 5 to 10 seconds.

9. A process according to claim 1 wherein when the starting core powder is subjected to preliminary granulation and sizing.

* * * * *